United States Patent [19]
Weber

[11] Patent Number: 5,335,610
[45] Date of Patent: Aug. 9, 1994

[54] SUSPENSION FOR COULTER WHEEL ASSEMBLY

[76] Inventor: David W. Weber, P.O. Box 2943, Winter Haven, Fla. 33883

[21] Appl. No.: 935,834

[22] Filed: Aug. 26, 1992

[51] Int. Cl.⁵ ............................................. A01B 49/04
[52] U.S. Cl. .................................. 111/136; 172/282; 172/654
[58] Field of Search ................. 111/136, 62, 134, 135, 111/57, 59, 60, 61, 52, 53, 194; 172/282, 283, 287, 446, 447, 569, 645, 654, 395, 602

[56] References Cited

U.S. PATENT DOCUMENTS

| | | | |
|---|---|---|---|
| 2,947,372 | 8/1960 | Olson | 111/52 |
| 3,436,098 | 4/1969 | Orendorff et al. | 111/57 |
| 4,116,140 | 9/1978 | Anderson et al. | 111/136 |
| 4,311,104 | 1/1982 | Steilen et al. | 111/62 |
| 4,417,530 | 11/1983 | Kopecky | 111/136 |
| 4,664,202 | 5/1987 | Applequist et al. | 111/57 |
| 4,762,075 | 8/1988 | Halford | 111/136 |

Primary Examiner—Clifford D. Crowder
Assistant Examiner—Michael A. Neas
Attorney, Agent, or Firm—Pettis & McDonald

[57] ABSTRACT

An improved suspension for a coulter wheel assembly of the type primarily intended for attachment to a tractor wherein the improved suspension is characterized by its construction including a plurality of pivotal support bars interconnecting a set of double disc openers with following press wheels is disclosed. The improved suspension includes a unique back angle pivot attachment of the coulter wheel assemblies to one of the pivoting support arms so that the coulter wheels and press wheels accurately track the direction of travel of a tractor, even when the direction of travel changes rapidly and frequently. A material may be deposited in the furrow created by the double disc openers attached to the improved suspension of this invention, and the depth of the furrow cut by the double disc opener may be adjusted.

7 Claims, 2 Drawing Sheets

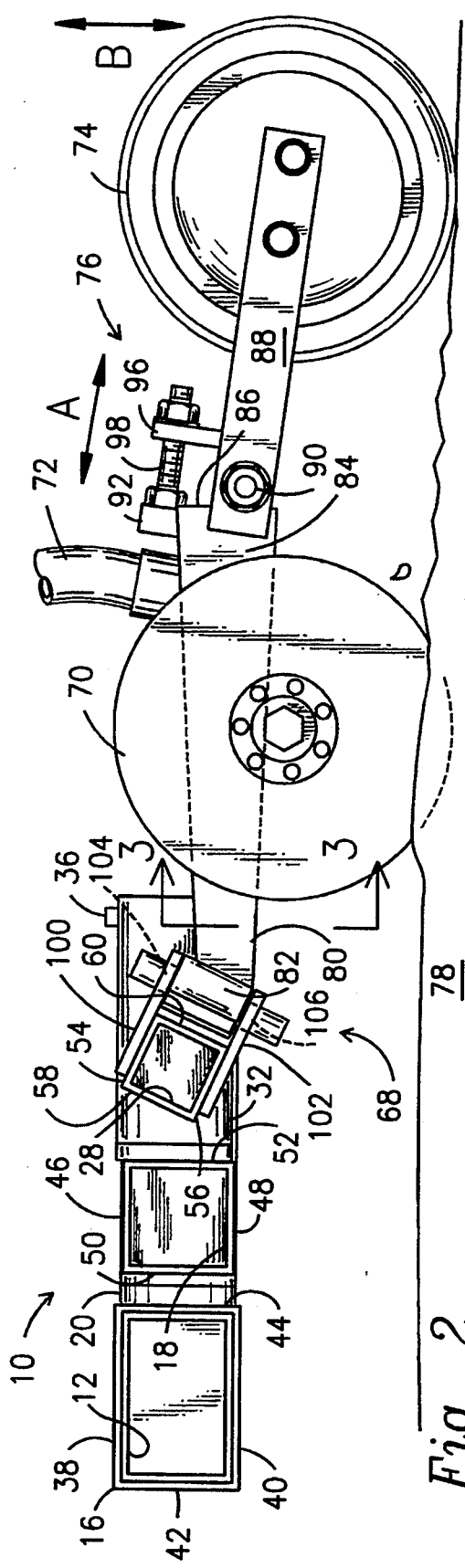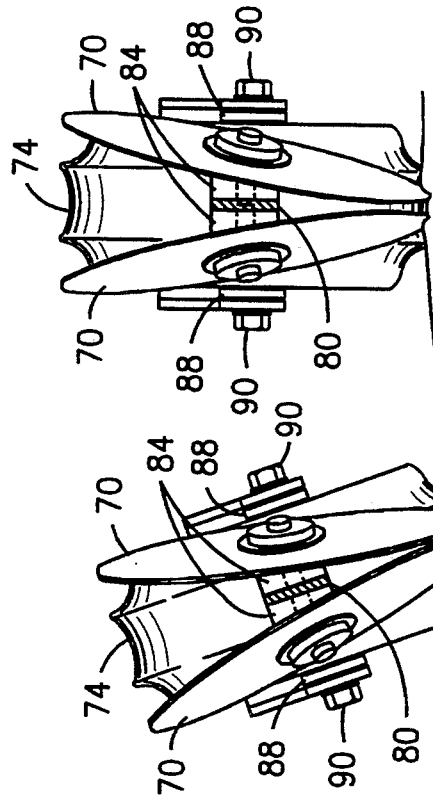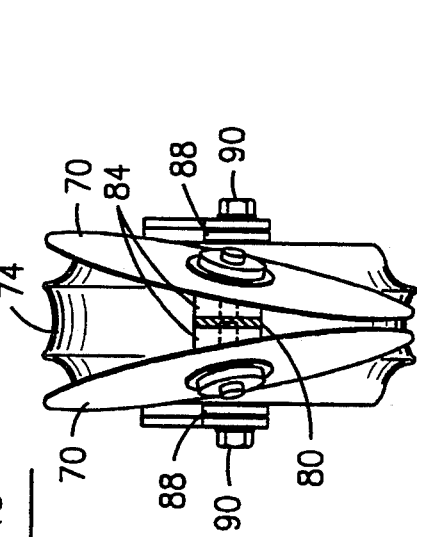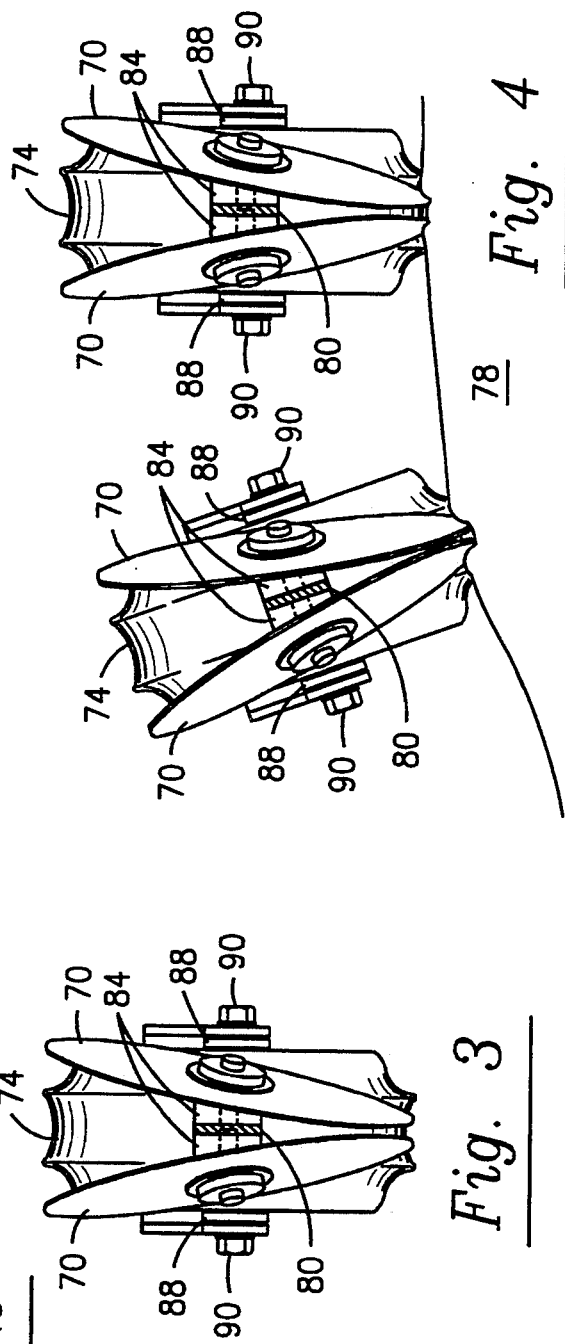

SUSPENSION FOR COULTER WHEEL ASSEMBLY

BACKGROUND OF THE INVENTION

1. Field of the Invention

The present invention relates to an improved suspension for a coulter wheel assembly of the type primarily intended for attachment to a tractor and use in combination therewith for applying agricultural chemicals, preferably in a granular form, though the invention is not limited thereto. The invention is characterized by the suspension frame for the coulter wheel assembly including a back angle pivot for the double disc openers and the following press wheels. By virtue of the pivoting support arms and the back angle pivot attachment of the coulter wheel means, the entire assembly will track properly behind the tractor, regardless of changes of direction made by the tractor. The invention is further characterized by its provision of depth adjustment means whereby the double disc openers of the assembly may be easily and efficiently adjusted for depth of cut so as not to disturb shallow roots of the crop being treated.

2. Description of the Prior Art

Within the agricultural industry, it is well known to use double disc openers for the purpose of creating a furrow in the soil so that agricultural chemicals, and even seeds, may be placed within the furrow. It is also known to follow the double disc openers with what is commonly referred to as a press wheel for the purpose of closing the furrow once material has been deposited therein. Such devices are typically assembled as a gang of double disc openers and following wheels which are typically hitched to and towed behind a tractor. Examples of such prior art devices are known in the patent literature and are illustrated and described in U.S. Pat. No. 522,329 to Packham; U.S. Pat. No. 537,261, to Avery; U.S. Pat. No. 3,348,505, to Smith; U.S. Pat. No. 3,658,018, to Connor; U.S. Pat. No. 4,377,979, to Peterson, et al.; and U.S. Pat. No. 4,926,767, to Thomas.

In this prior art and, in particular the patents to Packham and Peterson, it can be seen that means are provided for adjusting the depth of the furrow made by the device. However, in all of these prior art devices, the suspension means for the coulter wheels is such that when the tractor makes a sharp turn, the double disc openers tend to slide to one side, not tracking properly and not cutting a proper depth of furrow. This condition is particularly aggravated in the prior art devices which also employ a following press wheel.

It is, therefore, clear that there remains a need in the art for an improved suspension for such coulter wheel assemblies whereby the double disc openers and following press wheels will not only track properly when the towing implement makes sharp turns, as are often necessary in agricultural environments, but also which provides for a virtually constant depth of furrow so that the material being deposited is accurately, efficiently, and economically applied.

SUMMARY OF THE INVENTION

The present invention relates to an improved suspension for a coulter wheel assembly of the type primarily intended for attachment to a tractor and comprises a telescoping main support bar attached to the tractor. A first pivoting support is pivotally attached to the telescoping (moving) section of the main support bar and at least one second pivoting support is pivotally attached to the first pivoting support. Operatively attached to the second pivoting support is at least one coulter wheel means, and this attachment to the second pivoting support is accomplished by a back angle pivot means. It is the back angle pivot means, in combination with the first and second pivoting supports, which permits the coulter wheel means of this invention to follow the direction of travel of the tractor properly, while maintaining a predetermined depth of furrow opened.

The coulter wheel means of this invention comprises a double disc opener for creating the furrow, means for depositing material into the furrow created by the opener, a press wheel following the means for depositing whereby the furrow containing the material is closed, and a depth adjustment means operatively disposed between the opener and the press wheel so that the depth of the furrow opened may be adjusted and maintained.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 2 is a side view of the device shown in FIG. 1, also illustrating engagement of the soil by a double disc opener to create a furrow therein, the depositing of material into the furrow, and the following press wheel.

FIG. 3 is a sectional view taken generally along line 3—3 of FIG. 2, with the means for depositing removed.

FIG. 4 is a view similar to that of FIG. 3 showing engagement of the coulter wheel means with an uneven surface by virtue of the suspension of this invention.

Similar reference characters refer to similar parts throughout the several views of the drawings.

DETAILED DESCRIPTION

Figure 1:
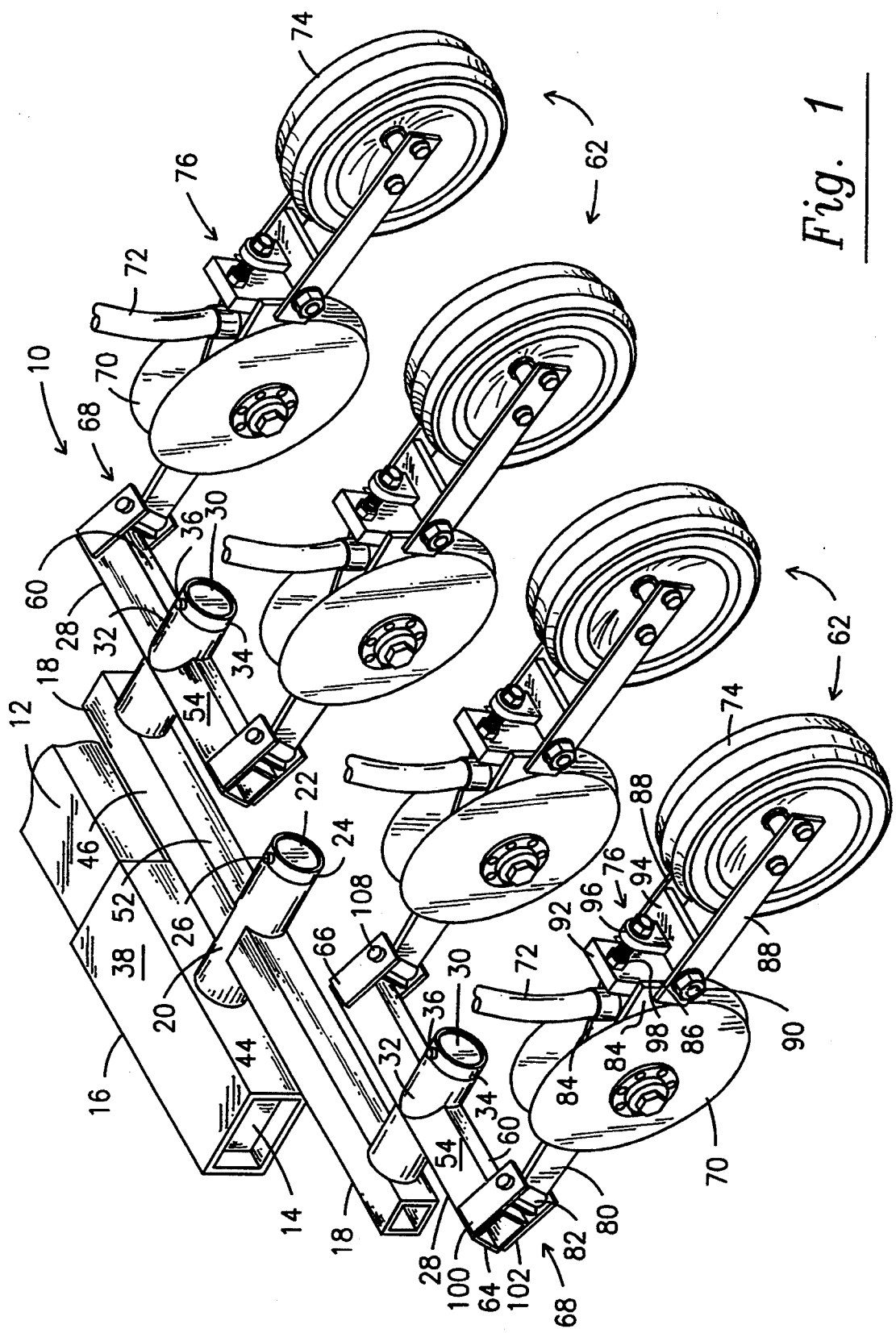
FIG. 1 is a perspective view of the improved suspension of this invention also illustrating the construction of the coulter wheel means.

The improved suspension of this invention is generally indicated as 10 in the views of FIGS. 1 and 2. As best seen in the perspective view of FIG. 1, the improved suspension 10 comprises a main support bar including a first section 12, one end of which (not shown) may be attached to a tractor, and a second end 14 of first section 12 receives a second section 16 of the main support bar. Second section 16 effectively telescopes onto first section 12 so that the position of the entire assembly may be adjusted toward and away from the tractor. In this preferred embodiment for the suspension 10, first section 12 and second section 16 are preferably formed from hollow, rectangular metal stock.

A first pivoting support 18 is pivotally attached to second section 16 of the main support bar. First pivoting support 18 is preferably formed from a hollow, four-sided bar, and a hollow, tubular first pivot arm 20 extends transverse to first pivoting support 18. A corresponding, round first pivot bar extends rearwardly from the second section 16, and first pivot bar 22 and first pivot arm 20 are sized and configured so that first pivot arm 20 is received by first pivot bar 22. A first slip ring 24 and first set screw 26 are provided for the purpose of removably attaching first pivoting support 18 onto the first pivot bar 22. Thus, first pivoting support 18 may rotate with respect to second section 16, and the axis of rotation is defined by the midpoint of first pivot bar 22.

In this preferred embodiment for the improved suspension 10, a pair of second pivoting supports 28 are pivotally attached substantially adjacent each end of first pivoting support 18. However, it is to be understood that the scope of this invention is intended to encompass an improved suspension 10 including only a single second pivoting support 28. Second pivoting supports 28 are pivotally attached to respective ends of first pivoting support 18 by second pivot bars 30 which extend rearwardly from first pivoting support 18 and second pivot arms 32 which extend transverse to second pivoting supports 28. The pivotal attachment is accomplished by second slip rings 34 and second set screws 36 in substantially the same fashion as set forth above.

Referring now to the view of FIG. 2, one may see that second section 16 of the main support bar defines a top surface 38, a bottom surface 40, a forward surface 42, and a rear surface 44. In similar fashion, first pivoting support 18 is defined by a top surface 46, a bottom surface 48, a forward surface 50, and a rear surface 52. In the preferred embodiment, respective top surfaces 38 and 46 and bottom surfaces 40 and 48 lie along a substantially common plane.

Still with regard to the view of FIG. 2, it can be seen that the second pivoting support 28 is defined by a top surface 54, a bottom surface 56, a forward surface 58, and a rear surface 60. However, second pivoting support 28 is positioned so that the planes defined by top surface 54 and bottom surface 56 are angular with regard to the substantially common planes defined by top surfaces 38 and 46 and bottom surfaces 40 and 48.

Referring again to the view of FIG. 1, it can be seen that this preferred embodiment for improved suspension 10 further comprises a pair of coulter wheel means, generally indicated as 62, operatively attached to each end of the second pivoting supports 28. As above, it is to be understood that the scope of this invention is not limited to the two pairs of coulter wheel means 62 as shown in the drawings, but intended to include a device having a single such coulter wheel means 62.

As stated above, in this preferred embodiment for improved suspension 10, a pair of coulter wheel means 62 are attached to each of the second pivoting supports 28, with one coulter wheel means 62 operatively mounted at each of the two ends, 64 and 66, respectively, of second pivoting supports 28. The attachment is accomplished by a back angle pivot means, generally indicated as 68, construction details for which are given below.

The coulter wheel means 62 further comprises a double disc opener 70, means 72 for depositing material into the furrow created by the double disc opener 70, a press wheel 74 following the means 72, and depth adjustment means, generally indicated as 76, operatively disposed between opener 70 and wheel 74.

Double disc opener 70 comprises a pair of offset discs which form a furrow in soil 78, as best seen in the views of FIGS. 2 and 4. The discs of the double disc opener 70 are rotatably mounted on disc frame 80, one end 82 of which is pivotally attached to the back angle pivot means 68. Opposite the end 82 of disc frame 80, the disc frame 80 comprises a pair of diverging disc bars 84, each having a second end 86. Press wheel 74 is pivotally attached to second ends 86 of disc frame 80 by a corresponding pair of press wheel bars 88, and the pivot point is defined by the axis of bolts 90.

The depth adjustment means 76 comprises a first plate 92 interconnecting opposed second ends 86 of disc frame 80 and a second plate 94 interconnecting corresponding press wheel bars 88. An upstanding tab is fixedly attached to second plate 94, and an adjusting screw operatively passes through an aperture (not shown) in tab 96 to engage first plate 92. Accordingly, adjusting screw 98 as indicated by directional arrow A in the view of FIG. 2 will cause press wheel 74 to raise or lower with respect to pivot point 90, as indicated by directional arrow B in the view of FIG. 2. That is to say, adjusting screw 98 to increase the distance between first plate 92 and tab 96 will effectively lower press wheel 74 resulting in a more shallow furrow being cut by double disc opener 70, while shortening the distance between first plate 92 and tab 96 will raise press wheel 74 to result in a deeper furrow being cut by double disc opener 70.

Referring now to the view of FIG. 2, it can be seen that the back angle pivot means 68 comprises a pivot bracket having a top bracket plate 100 attached to the top surface 54 of second pivoting support 28, and a bottom bracket plate 102 attached to bottom surface 56 of the second pivoting support 28. An aperture 104 is formed through top bracket plate 100, and a corresponding aperture 106 is formed through bottom bracket plate 102. Disc frame 80 is pivotally attached to back angle pivot means 68 by passing a pivot pin 108 through one end 82 of disc frame 80 and corresponding apertures 100 and 106. It is this back angle attachment of the coulter wheel means 62 to the second pivoting supports 28 which primarily provides the excellent tracking capabilities of coulter wheel means 62. In combination with the pivoting second supports 28 and first supports 18, the coulter wheel means 62 of this invention not only follow the terrain of the soil accurately (as shown in the view of FIG. 4), but also accurately follow the tractor regardless of its changes of direction. As pointed out above, this has heretofore been virtually impossible to achieve utilizing ganged assemblies including both a double disc cutter and a press wheel, all as shown in the preferred embodiment of this invention.

Having thus set forth a preferred construction for the improved suspension 10, one is again reminded that the scope of this invention is not to be limited to the exact construction shown in the drawings and described above. This is but a preferred embodiment utilizing a pair of second pivoting supports 28, to each end of which are attached a pair of coulter wheel means 62. It is also to be understood that while means 72 used for depositing material in the furrow created by each double disc opener 70 is illustrated as a hollow tube through which granular material may be delivered, the invention is not limited either to the use of a hollow tube or to depositing only granular material.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A suspension for a coulter wheel assembly of the type primarily intended for attachment to a tractor, said suspension comprising:

a main support bar comprising a first section attached to the tractor and a second section slidingly attached to said first section for movement away from and toward the tractor; a first pivoting support pivotally attached to said second section;

a pair of second pivoting supports pivotally attached to said first pivoting support;

a pair of coulter wheel means operatively attached to each of said pair of said second pivoting supports, said coulter wheel means being attached to said second pivoting support by a back angle pivot means, and said coulter wheel means comprising: a double disc opener, means for depositing material into a furrow created by said opener, a press wheel following said means for depositing, whereby the furrow containing the material is closed, and depth adjustment means operatively disposed between said opener and said wheel, whereby the depth of the furrow may be adjusted.

2. A suspension for a coulter wheel assembly of the type primarily intended for attachment to a tractor, said suspension comprising:

a main support bar comprising a first section attached to the tractor and a second section slidingly attached to said first section for movement away from and toward the tractor;

a first pivoting support pivotally attached to said second section; at least one second pivoting support pivotally attached to said first pivoting support;

and a pair of coulter wheel means operatively attached to said second pivoting support, said coulter wheel means being attached to said second pivoting support by a back angle pivot means, and said coulter wheel means comprising a double disc opener, means for depositing material into a furrow created by said opener, a press wheel following said means for depositing, whereby the furrow containing the material is closed, and depth adjustment means operatively disposed between said opener and said wheel, whereby the depth of the furrow may be adjusted.

3. A suspension for a coulter wheel assembly of the type primarily intended for attachment to a tractor, said suspension comprising:

a main support bar comprising a first section attached to the tractor and a second section slidingly attached to said first section for movement away from and toward the tractor;

a first pivoting support pivotally attached to said second section; at least one second pivoting support pivotally attached to said first pivoting support, said main support bar and said first pivoting support each including respective top and bottom surfaces respective forward and rear surfaces, said respective top surfaces lying along a substantially common plane, one to the other, when said respective forward surfaces are substantially parallel, one to the other, and wherein said second pivoting support includes a top and bottom surface, the plane of said second support top surface being angular with respect to said common plane; and at least one coulter wheel means operatively attached to said second pivoting support, said coulter wheel means being attached to said second pivoting support by a back angle pivot means, and said coulter wheel means comprising a double disc opener, means for depositing material into a furrow created by said opener, a press wheel following said means for depositing, whereby the furrow containing the material is closed, and depth adjustment means operatively disposed between said opener and said wheel, whereby the depth of the furrow may be adjusted.

4. A suspension as in claim 3 wherein said back angle pivot means comprises a pivot bracket including a top bracket plate attached to said second support top surface and a bottom bracket plate attached to said second support bottom surface such that said top and bottom bracket plates are substantially parallel to each other, each of said plates comprising an aperture formed therein and a pivot pin mounted through said apertures such that said coulter wheel means is attached to said second pivoting support, and said pivot pin is substantially normal to said top and bottom bracket plates.

5. A suspension as in claim 4 wherein said coulter wheel means further comprises a disc bar, a first end of said bar being attached to said second pivoting support by said pivot pin, said double disc opener being operatively attached to said bar rearwardly of said first end, and said bar having a second end, said press wheel being connected to said second end.

6. A suspension as in claim 5 wherein said coulter wheel means further comprises a press wheel bar, a first end of said press wheel bar being pivotally attached to said disc bar second end, said press wheel being operatively attached to said press wheel bar rearwardly of said press wheel bar first end, and said depth adjust means being disposed in interconnecting relation between said disc bar second end and said press wheel bar first end such that said press wheel bar may be caused to pivot with respect to said disc bar.

7. A suspension as in claim 6 wherein said means for depositing comprises a tube having an open end, said open end being disposed intermediate said double disc opener and said depth adjustment means.

* * * * *

UNITED STATES PATENT AND TRADEMARK OFFICE
CERTIFICATE OF CORRECTION

PATENT NO. : 5,335,610

DATED : AUGUST 9, 1994

INVENTOR(S) : DAVID W. WEBER

It is certified that error appears in the above-identified patent and that said Letters Patent is hereby corrected as shown below:

Claim 3, column 6, line 8, after the word "surfaces" and before the word "respective" insert the word --and--.

Signed and Sealed this

Eighth Day of November, 1994

Attest:

BRUCE LEHMAN

Attesting Officer     Commissioner of Patents and Trademarks